UNITED STATES PATENT OFFICE 1,966,068

MANUFACTURE OF PHTHALIMIDE

Alphons O. Jaeger, Mount Lebanon, and Lloyd C. Daniels, Crafton, Pa., assignors, by mesne assignments, to The Selden Research & Engineering Corporation, Pittsburgh, Pa., a corporation of Delaware No Drawing. Application November 18, 1930, Serial No. 496,561

15 Claims. (Cl. 260—124)

This invention relates to the manufacture of phthalimide and N-substituted phthalimides, and more particularly to the production of phthalimide and N-substituted phthalimides of high purity from impure raw material.

In the past phthalimide has been produced by passing anhydrous ammonia into molten phthalic anhydride, the phthalic anhydride used being, of course, of the grade ordinarily obtained on the market, that is to say practically chemically pure. This process results in phthalimide of excellent purity with good yields, but is expensive because the weight of phthalic anhydride taking part in the reaction is many times that of the ammonia and the use of an expensive practically chemically pure phthalic anhydride raises the cost of the phthalimide always in proportion to the cost of the phthalic anhydride used.

According to the present invention the surprising discovery has been made that phthalimides of high purity can be obtained from crude phthalic anhydride and even from materials containing phthalic anhydride which are so impure that they cannot be economically purified and are, therefore, valueless and in some cases are actually a liability because it costs money to dispose of them. These wastes, although they may contain in some cases as low as 30% phthalic anhydride, can be used in the process of the present invention to produce phthalimides of high purity with good yields; in fact the yields are as high as with chemically pure phthalic anhydride except where the percentage of phthalic anhydride in the crude material is so low that the vapor pressure of the phthalimide produced is not high enough to permit complete recovery of all the phthalimide obtained. In the latter cases, however, when dealing with waste products that have no value or which are actually a liability, the loss of a few percent of phthalic anhydride is of course economically of practically no importance as it involves the cost of the product only in a very minor detail by slightly decreasing the capacity of the equipment used.

In the process of the present invention the crude phthalic anhydride or substances containing phthalic anhydride are melted, and ammonia gas or vapors of a monoamine are passed in at a temperature which is preferably about or somewhere above the boiling point of water but below the temperature at which phthalic anhydride sublimes out of the product in substantial quantities. The reaction takes place even at fairly low temperatures, but it is desirable of course to use as high a temperature as is possible without losing too much phthalic anhydride because the reaction of course takes place more rapidly at higher temperatures and the capacity of equipment used is correspondingly increased. The invention is not limited to any particular temperature, and in fact the best compromise between high reaction speed and low losses of phthalic anhydride by sublimation will in general not be the same with all crude low materials used, since when the crude material contains a relatively high percentage of phthalic anhydride losses by sublimation take place at temperatures which are not greatly above the boiling point of water, but with materials such as, for example, the tarry residue obtained from distillation of crude phthalic anhydride or so-called sublimer drainings, which are the tar residues from sublimers in which impure phthalic anhydride is purified by sublimation, the percentage of phthalic anhydride is much lower and the tar constituents tend to protect it from sublimation. With such materials, of course, a higher reaction temperature may be used. Of course if it is desired to operate in closed vessels it is possible to use much higher reaction temperatures, and such operation is, of course, included in the present invention, but for practical, large scale production the increase in reaction speed possible by using pressure equipment is normally not sufficient to counterbalance the higher cost of such installations. This modification, therefore, while included in the scope of the invention, is not preferred.

The absorption of ammonia in the molten, crude phthalic anhydride containing material is quite rapid and is continued until ammonia or the monoamine vapors begin to escape in considerable quantities. Then the temperature is raised and a mixture of ammonia or monoamine and subliming gas or vapor, preferably a relatively inert subliming gas, is passed through at the higher temperature, and phthalimide is sublimed out. The amount of ammonia in the subliming gas is very small, and is intended only to complete the reaction with the last traces of phthalic anhydride. It can, of course, be omitted with some loss in yield.

The present invention can be carried out in a very simple manner; thus, for example, the treating vessel is preferably connected with the source of crude phthalic anhydride in such a way that the latter can be transferred in a molten condition when dealing with residues such as tarry residues from the distillation of phthalic anhydride or sublimer drainings. The reason for this procedure is that the molten residues can be maintained in molten condition with relative ease, but if they once solidify it is difficult to remelt them because of the low heat conductivity of the material which tends to insulate the central portions of any charge in the melter. Where, of course, a less crude material is used, such as, for example, the crude phthalic anhydride condensed from the converter or the tailings from the latter portions of a fractional condenser, it is not necessary to transfer it to the reaction vessel in the molten state and will normally be preferable to charge it in the solid state.

The ammonia used may be pure anhydrous ammonia or it may be obtained from by-product ammonia liquor, its purity being of practically no interest as the crude phthalic anhydride is so impure that any organic impurities added by the ammonia have no effect on the product. In fact it is a most surprising feature of the present invention that although dealing with materials of high impurity, and in some cases materials that are ordinarily considered almost impossible to handle in a chemical reaction, for example the tarry residues from distillation or sublimation of crude phthalic anhydride, the phthalimide obtained is of high purity and the yield is good. The reaction of the present invention constitutes, therefore, a rare exception to the general rule that high yields and high purity cannot be obtained without relatively pure chemical reagents.

The invention has been described more particularly in connection with the production of unsubstituted phthalimide. Where substituted phthalimides are to be produced, the corresponding primary amine is used. Thus, for example, methylphthalimide is obtained from methylamine, omegahydroxyethylphthalimide from ethanolamine, etc. The reaction is generally applicable to primary amines which form phthalimides having sufficient vapor pressure to permit subliming out from the reaction mixture. Where amines are used which produce phthalimides of low volatility, for example phthalanilide, higher sublimation temperatures should ordinarily be employed.

While the phthalimides obtained by the present invention, even from extremely crude material, are of high purity, they may sometimes be colored because alphanaphthaquinone is almost always present as an impurity in crude phthalic anhydride and this compound tends to react with itself and with phthalic anhydride to form red and green dyes. These dyes are slightly volatile, and if the present invention is carried out with crude phthalic anhydride which is highly colored, as, for example, when the tarry residues or tailings from fractional condensation of phthalic anhydride containing vapors are used, the phthalimide is liable to be colored. Even though it may be practically chemically pure and the amount of color too small to be shown by analysis, it is desirable in most cases to obtain a pure white phthalimide, and wherever a highly colored crude is used this can be achieved by passing the vapors through catalytic adsorbents such as those described in the co-pending application of Alphons O. Jaeger Serial No. 337,534 filed February 4, 1929. We have found that the catalytic adsorbent which is most efficient for a good volume is alumina gel, but of course any other catalytic adsorbent such as the others described in the above referred to Jaeger application may be used.

Theoretically, phthalimides result without loss when monoammonium or monoamine phthalates are heated. Practically, however, an excess of base is desirable because, as has been pointed out above, in the case of ammonia it is sufficiently cheap and forms but a very small portion of the phthalimide by weight. Although the invention in its broader aspects is not limited to an amount of base in excess of that sufficient to produce the monophthalate, it is preferred to use such an excess, which may be a slight excess in the case of crudes which are not too high in their impurity content or may be a considerable excess in the case of very crude material. No harm is done if the excess of base is sufficient to produce the diphthalate as this is transformed by heat into the phthalimide as readily as the mono-salt but of course there is some loss in base. However, when very crude material is used, such as, for example, the tarry residues referred to above, the exact content of phthalic anhydride is normally not known and a considerable excess of base is, therefore, ordinarily used with such material.

If a considerable excess of ammonia or amine is used it may in some cases be desirable to recover it from the exhaust vapors passing through the phthalimide condenser.

The temperatures at which the sublimation of phthalimide takes place may vary within wide limits, temperatures from 150 to well over 300° C. being usable. However, at the lower temperatures the rate of sublimation is too slow to be commercially attractive and at temperatures much above 300° C. a certain amount of decomposition of the phthalimide ensues. While, therefore, the invention is not limited in its broader aspects to any particular subliming temperature, in its preferred modification temperatures from 250–300° C. are used as temperatures in this range give rapid sublimation with practically no loss from decomposition. The flexibility of the process with regard to temperature is an added advantage since it is not necessary to accurately control the temperature of the sublimer, and therefore expensive temperature control means can be eliminated. While it is possible to operate the process with practically no temperature control, it is ordinarily desirable to maintain the sublimer temperature as uniform as possible without requiring the use of expensive regulating equipment.

The invention will be described in greater detail in connection with the following specific examples, which illustrate various typical embodiments thereof.

*Example 1*

Crude phthalic anhydride as it is condensed from the converters, being of a grayish or pinkish color and containing impurities such as alphanaphthaquinone and its condensation products, is charged into a reaction vessel, melted, and anhydrous ammonia is passed in, preferably through an efficient gas distributor, until the rapid absorption of ammonia ceases. The temperature is then raised to 250 to 280° C., and an inert gas such as superheated steam, carbon dioxide or boiler stack gases is passed through the sublimer at the high temperature. Phthalimide sublimes out in a state of high chemical purity and is condensed from the vapors preferably in a condenser which is maintained at a temperature sufficiently high so as to be above the boiling point of water. If the phthalic anhydride is not too highly colored, a colorless phthalimide is obtained.

*Example 2*

The tarry residue from the distillation of phthalic anhydride or sublimer drainings in a molten condition are charged into the reaction vessel, and ammonia, either anhydrous or from coal tar by-product ammonia, is passed into the molten mass, the amount of ammonia being preferably considerably in excess of that required to transform the phthalic anhydride present into the monoammonium salt. After sufficient ammonia has been absorbed, which absorption may be facilitated by the agitation of the molten mixture, the temperature is raised to 280-300° C. and superheated steam or other inert gas is blown through at the same temperature. The vapors containing phthalimide are passed through a metal basket containing a catalytic adsorbent such as alumina gel. The alumina gel adsorbs all of the colored impurities and the phthalimide is then condensed out of the vapors in a condenser maintained above the boiling point of water. The product is practically chemically pure and is in the form of beautiful glistening leaves or scales. The yield is high, being practically quantitative with respect to phthalic anhydride entering into the reaction, but owing to the low percentage of phthalic anhydride in the crude material, which may run from 30 to 60%, a considerable amount of phthalimide is retained in the tarry residue from the sublimation.

*Example 3*

The tailings from the condensation of phthalic anhydride vapors from a converter or sublimer containing from 50-70% phthalic anhydride together with large amounts of maleic acid, naphthaquinone and similar impurities and being of a dirty green or pink color, are melted and ammonia passed in as in Example 1. The amount of ammonia may preferably be between that required for the monoammonium salt and for the di-ammonium salt. When all the ammonia has been absorbed, the temperature is raised to 250 to 280° C., and the phthalimide is sublimed out with boiler stack gases, passing through a catalytic adsorbent such as alumina gel and being condensed in a condenser maintained above the boiling point of water. A beautiful snow-white phthalimide is obtained.

*Example 4*

Crude phthalic anhydride as described in Example 1 is melted and ethanolamine is added until rapid adsorption ceases. The temperature is then raised to 250-280° C., and an inert gas such as superheated steam, carbon dioxide or boiler stack gases is passed through the sublimer at the high temperature. Omegahydroxyethylphthalimide sublimes out in a state of high purity and is condensed in a condenser which is maintained at a temperature above the boiling point of water. If the phthalic anhydride is not too highly colored, a colorless hydroxyethylphthalimide is obtained. If highly colored phthalic anhydride is used the vapors should preferably be passed through alumina gel or similar catalytic adsorbent before being condensed.

*Example 5*

The tarry residue as described in Example 2 is treated with methylamine instead of ammonia, the process steps being identical with those described in Example 2. An excellent yield of N-methylphthalimide is obtained.

*Example 6*

A crude phthalic anhydride as described in Example 1 is treated with aniline under the conditions described in Example 1 except that the sublimation temperature is from 280-320° C. Phthalanilide of high purity is obtained.

What is claimed as new is:

1. A method of producing pure phthalimide, which comprises bringing about the reaction of ammonia with a molten crude or impure air oxidation phthalic anhydride at a temperature above the melting point of the crude product, the amount of ammonia entering into the reaction being at least sufficient to form the mono-ammonium phthalate, subjecting the material to sublimation at temperatures at which pure phthalimide sublimes and condensing the pure phthalimide contained in the vapors.

2. A method according to claim 1, in which the pure phthalimide containing vapors are passed through a catalytic adsorbent.

3. A method according to claim 1, in which the pure phthalimide containing vapors are passed through alumina gel.

4. A method according to claim 1, in which the sublimation takes place in the presence of superheated steam.

5. A method according to claim 1, in which the pure phthalimide is condensed from the vapors in an ordinary condenser maintained at a temperature above 100° C. and below 238° C.

6. A method according to claim 1, in which the crude phthalic anhydride is a tarry residue from the distillation or sublimation of impure air oxidation phthalic anhydride.

7. A method according to claim 1, in which the crude phthalic anhydride is a tarry residue from the distillation or sublimation of impure air oxidation phthalic anhydride, the tarry material being caused to react with ammonia without being allowed to solidify.

8. A method according to claim 1, in which the sublimation is between 250 and 300° C.

9. A method of producing a pure phthalimide, which comprises bringing about the reaction of an ammonia compound having at least two hydrogen atoms attached to nitrogen with a molten crude or impure air oxidation phthalic anhydride at a temperature above the melting point of the crude product, the amount of the ammonia compound entering into the reaction being at least sufficient to form the monophthalate, subjecting the material to sublimation at temperatures at which the corresponding pure phthalimide sublimes, and condensing the pure phthalimide contained in the vapors.

10. A method according to claim 9, in which the vapors containing the pure phthalimide are passed through a catalytic adsorbent.

11. A method according to claim 9, in which the vapors containing the pure phthalimide are passed through alumina gel.

12. A method according to claim 9, in which the sublimation takes place in the presence of superheated steam.

13. A method according to claim 9, in which the pure phthalimide is condensed from the vapors in a condenser maintained at a temperature above 100° C. and below the melting point of the phthalimide in question.

14. A method according to claim 9, in which the ammonia compound is a primary hydroxyalkylamine.

15. A method according to claim 9, in which the ammonia compound is ethanolamine.

ALPHONS O. JAEGER.
LLOYD C. DANIELS.